May 10, 1927.
R. O. LEWIS
1,627,654
VEHICLE ATTACHED AND OPERATED TIRE PUMP
Filed Oct. 16, 1926
2 Sheets-Sheet 1
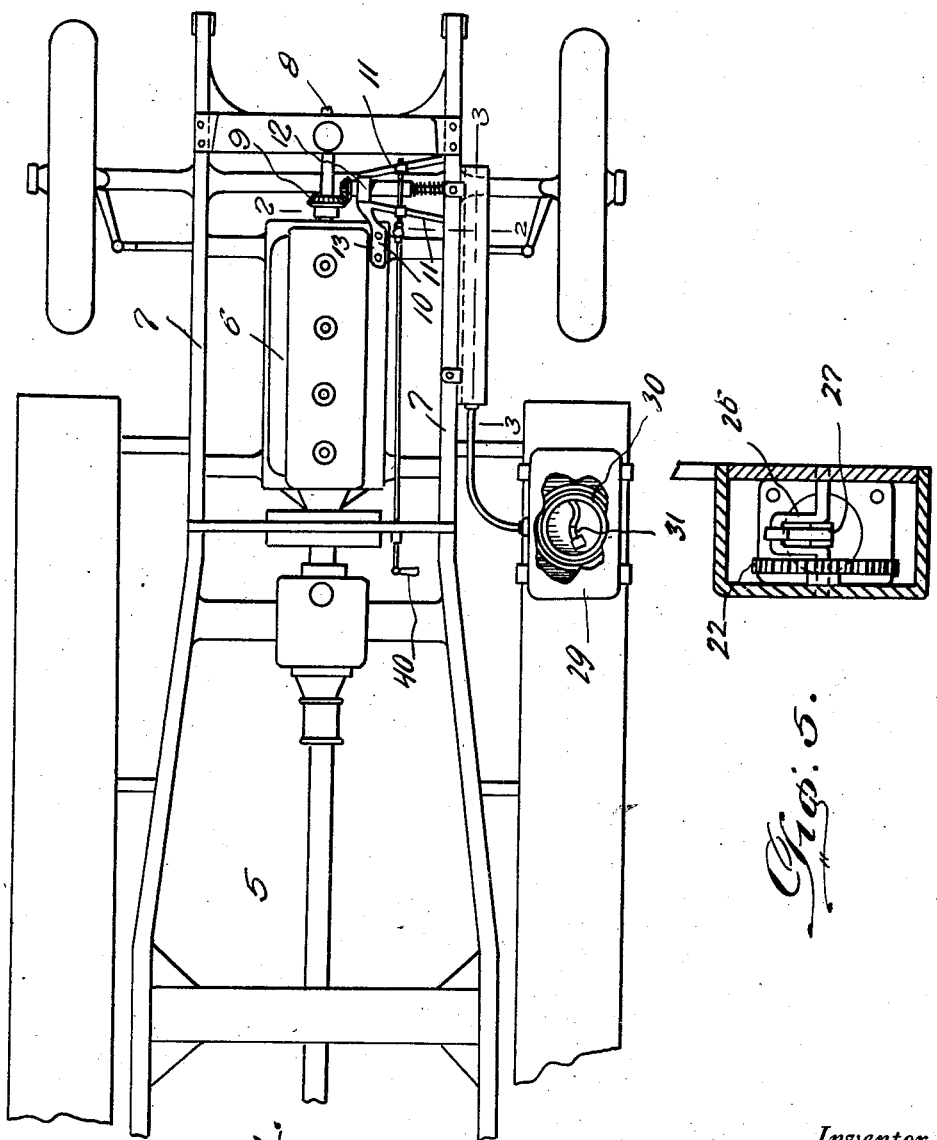
Inventor
R. O. Lewis,
By Clarence A. O'Brien
Attorney

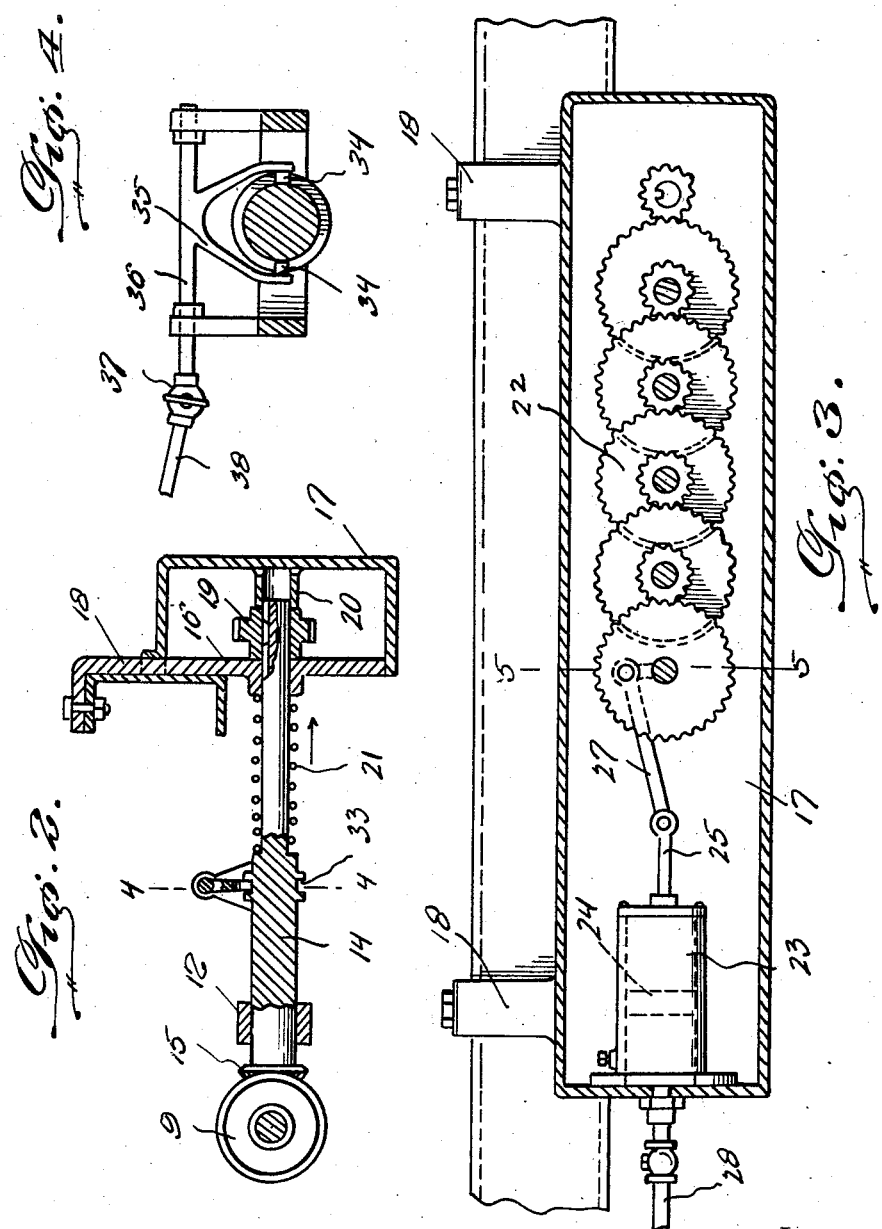

Patented May 10, 1927.

1,627,654

UNITED STATES PATENT OFFICE.

RAYMOND O. LEWIS, OF AINSWORTH, NEBRASKA.

VEHICLE ATTACHED AND OPERATED TIRE PUMP.

Application filed October 16, 1926. Serial No. 142,042.

This invention relates generally to pumps for inflating automobile tires and has for its primary object to provide a pump mechanism that is constructed for association with and operation by the vehicle. By such a provision the pump will be always ready for use and manual labor will not be required in properly inflating any one or all of the tires of the vehicle.

In carrying out the present invention, I provide a pump mechanism that is associated at a convenient point with the vehicle and includes means operated by the crank shaft of the vehicle motor so as to control the operation of the pump during the inflation of the tires.

One of the most important objects of the invention is to provide a pump of this character that is extremely simple of construction, and one that may be associated with practically all types of automobiles without in any manner whatever altering the construction of the machine and without requiring great expenditure for the installation of the device.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a fragmentary skeleton plan view of an automobile equipped with a pump constructed in accordance with the present invention.

Figure 2 is a transverse section taken substantially upon the line 2—2 of Figure 1 for more clearly disclosing the means whereby the pump mechanism may be operatively associated with or disconnected from the crank shaft of the automobile engine.

Figure 3 is an enlarged longitudinal section taken substantially upon the line 3—3 of Figure 1 for more clearly disclosing the pump and the engine operated gear train in connection therewith.

Figure 4 is a detail transverse section taken substantially upon the line 4—4 of Figure 2 for more clearly disclosing the control means for operatively connecting the pump mechanism with the engine crank shaft for detaching the same therefrom, and Figure 5 is a detail vertical section taken substantially upon the line 5—5 of Figure 3.

Now having particular reference to the drawings, 5 designates generally a conventionally constructed automobile consisting of the usual power plant or engine 6 mounted at the forward end of the vehicle between the usual frame bars 7—7. In carrying out my invention the engine crank shaft 8 is equipped directly in front of the motor block with a beveled gear 9. Furthermore, I dispose at the side of this beveled gear a bracket unit 10 consisting of a pair of laterally extending outwardly converging side arms 11—11 the inner ends of which are connected by a bearing 12, while at the inner end of one of the arms is an attaching plate 13 suitably constructed to facilitate the attachment of the bracket to the usual flange of the motor 6, see Figure 1.

Journaled within this bearing 12 of said bracket 10 is a transversely extending shaft 14, the inner end of which is equipped with a beveled gear 15. The opposite end of the shaft 14 is reduced and extends through a bearing opening in the rear wall 16 of a relatively elongated gear casing 17 which rear wall 16 of said casing is equipped at its upper edge with a pair of brackets 18—18 constructed for engagement with and rigid attachment to the adjacent chassis bar 7 of the vehicle frame. The end of this shaft 14 extending into the casing 17 has splined connection with a relatively small spur gear 19 that is braced by a sleeve 20 formed upon the inner side of the casing outer wall and having engagement over the inner end of the shaft 14 at all times, see Figure 2.

Surrounding the reduced end of the shaft 14 is an expansible coil spring 21 that normally forces the shaft in such a direction as to maintain the bevel gear 15 in mesh with the engine crank shaft gear 9.

Within the casing 17 is a train of reduction gearing 22, while upon the end wall of the casing 17 opposite from the gear 19 carried by the shaft 14 is a pump cylinder 23 within which is rectilinearly movable a piston 24 the rod 25 of which is operatively connected to a crank shaft 26 within the casing and connected to the adjacent gear of the train 22 by reason of a connecting rod 27.

From the inner end of the cylinder 23 is led an air conveying pipe 28 that leads into a suitable hose box 29 arranged upon the adjacent running board of the vehicle and within which is a length of flexible hose 30, one end of the hose has communication with the pipe 28 while the other end of the hose is equipped with a suitable tire valve connecting nozzle 31.

Intermediate the ends of the shaft 14 the same is formed with a circumferential channel 33 into which at opposed points project the usual pins 34—34 of a depending yoke 35 integral with a shaft 36 spanning the arms 11—11 of the before mentioned shaft supporting bracket 10, said shaft being suitably journaled within registering bearings in the arms as clearly indicated in Figure 4. Connected to one end of this shaft 36 by reason of the universal joint 37 is an operating rod 38 that extends rearwardly in inclined manner and passes through the dash and instrument board of the vehicle and equipped at its extreme inner end with an operating handle 40.

Obviously by rotating said handle 40 in one direction, the shaft 14 is slid laterally in the direction of the arrow in Figure 2 for disengaging the gears 15 and 9, obviously permitting the motor to be operated without imparting any operation to the shaft 14. Suitable means (not shown) may be, and preferably is provided for maintaining the operating rod 38 in position whereby the shaft 14 is maintained out of operative connection with the crank shaft of the motor 6.

It will thus be seen that I have provided a highly novel, simple, and efficient form of automobile tire inflating pump that is well adapted for all the purposes heretofore designated, and even though I have herein shown and described the invention as consisting of certain detail structural elements it is nevertheless to be understood that some changes may be made therein without effecting the spirit and scope of the appended claim.

Having thus described the invention, what I claim as new and desire to secure by Letters Patent is:—

In a tire pump structure for automobiles, an elongated housing, means for rigidly disposing the housing upon one frame bar of the automobile, an air pump mounted within the casing on one end wall thereof, a train of gears mounted between the side walls of the casing, means operatively connecting one end of the train of gears with the air pump, a shaft having a spline association with the other end of the train of gears, said shaft being slidable through an opening in one side of the casing, means for sliding the shaft, driving means for said shaft, said means being engageable and disengageable by the sliding of said shaft.

In testimony whereof I affix my signature.

RAYMOND O. LEWIS